United States Patent [19]

Payne

[11] Patent Number: 4,922,668
[45] Date of Patent: May 8, 1990

[54] SERVICE ACCESS UNIT FOR FLOORS

[75] Inventor: Harold J. W. Payne, Chester, England

[73] Assignee: Bally Engineered Structures, Inc., Bally, Pa.

[21] Appl. No.: 879,226

[22] PCT Filed: Mar. 19, 1986

[86] PCT No.: PCT/US86/00571
§ 371 Date: Jun. 19, 1986
§ 102(e) Date: Jun. 19, 1986

[87] PCT Pub. No.: WO86/05833
PCT Pub. Date: Oct. 9, 1986

[30] Foreign Application Priority Data

Mar. 27, 1985 [GB] United Kingdom ............... 8507915

[51] Int. Cl.$^5$ .................. E04B 5/48; H02G 3/12; H02G 3/18
[52] U.S. Cl. ......................... 52/221; 174/49; 174/65 R
[58] Field of Search ............. 52/221; 174/48, 50, 174/49, 65 R

[56] References Cited

U.S. PATENT DOCUMENTS

| | | | |
|---|---|---|---|
| 2,871,457 | 1/1959 | Jencks et al. | 174/50 |
| 3,047,650 | 7/1962 | Reiland | 174/49 |
| 3,131,512 | 5/1964 | Mac Leod, Jr. | 174/65 R |
| 3,485,933 | 12/1969 | Flachbarth | 174/65 R |
| 3,895,178 | 7/1975 | Huibrechtse | 174/48 |
| 3,903,666 | 9/1975 | Fork | 52/173 |
| 3,956,573 | 5/1976 | Meyers et al. | 174/48 |
| 4,096,347 | 6/1978 | Penczak | 52/221 |
| 4,237,666 | 12/1980 | Kohaut | 52/221 |
| 4,289,921 | 9/1981 | Gartner et al. | 174/48 |
| 4,297,524 | 10/1981 | Fork | 52/221 |
| 4,338,484 | 7/1982 | Littrell | 174/48 |
| 4,408,090 | 10/1983 | Kohaut | 52/221 |
| 4,443,654 | 4/1984 | Flachbarth et al. | 174/48 |
| 4,499,332 | 2/1985 | Shea et al. | 52/221 |
| 4,507,900 | 4/1985 | Landis | 52/221 |
| 4,591,656 | 5/1986 | Mohr | 174/48 |

FOREIGN PATENT DOCUMENTS

| | | |
|---|---|---|
| 57114 | 10/1938 | Denmark . |
| 1708410 | 7/1971 | Fed. Rep. of Germany . |
| 741432 | 12/1955 | United Kingdom . |
| 2099898 | 12/1982 | United Kingdom . |

Primary Examiner—Michael Safavi
Attorney, Agent, or Firm—Parmelee, Miller, Welsh & Kratz

[57] ABSTRACT

A service access unit for a floor system having elongate trunking for one service feed segregated from other service feed or feeds, has a frame to extend across and beyond such trunking at least to one side. The frame is securable in an aperture in the floor of greater size than an included lesser aperture into the top of the trunking. A subsidiary member fits within the frame and extends into said lesser aperture in affording outlet for the service in the trunking. Outlet for at least one other service whose feed is outside the trunking can be taken from at least one side of the subsidiary member but within the frame.

9 Claims, 1 Drawing Sheet

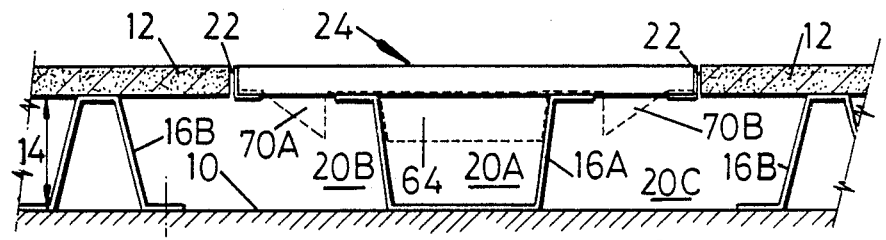
FIG. 1
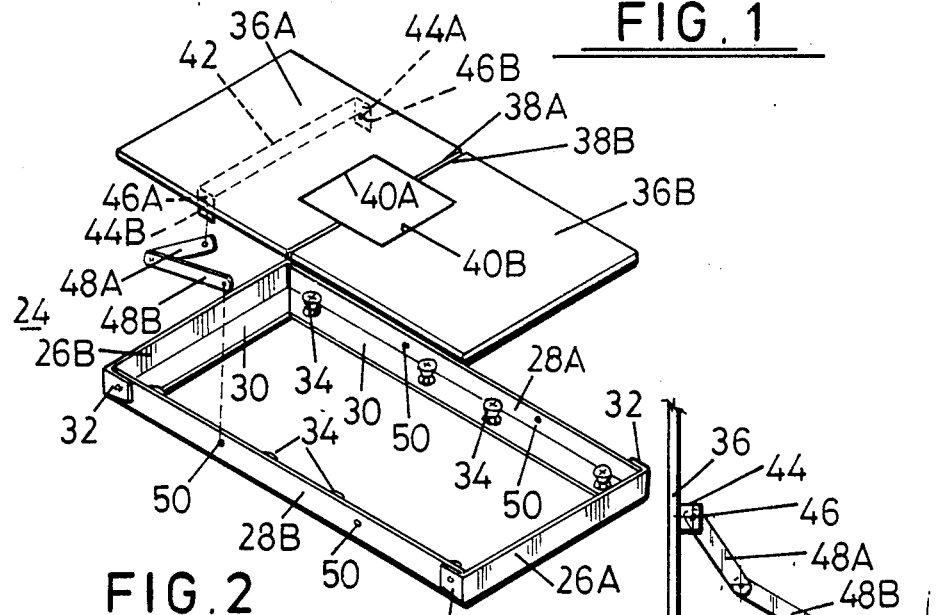
FIG. 2
FIG. 3
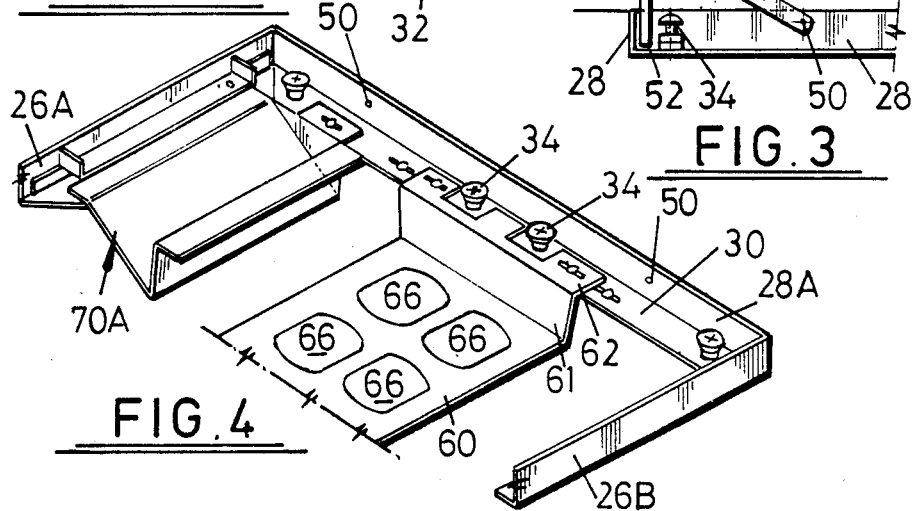
FIG. 4

SERVICE ACCESS UNIT FOR FLOORS

The invention relates to service access arrangements for flooring systems having provision below their floor surface for taking services including electrical power, communications etc.

Copending patent application No. 8507914 (P1466) concerns such a flooring system that has particular application as a so-called suspended floor, such as added-on to an existing floor as a base or substrate during refurbishing buildings, and to segregation of services. As described in that application segregation ducting is usually provided in sections capable of fitting end-to-end, and further in spaced parallel relation over broad floors. Such segregation ducting actually isolates electric power service feeds in a highly satisfactory manner, and further allows safe feeding sideways into trunking extending away from the ducting for other services to run segregated within and to one or both sides of the trunking. Such trunking, including dividers for spaces between the trunking in three- or more-way segregation, serve directly in supporting panels of the new floor.

It will be evident that access will be required to the services in and/or alongside such trunking, often along its length. It is convenient to do so via service access units that are let into the new floor, and especially advantageous utilising units embodying this invention.

According to this invention, a service access unit is provided in, or for letting into, a floor system having elongate trunking for one service feed segregated from other service feed or feeds, the unit comprising a frame to extend across such trunking and beyond such trunking at least to one side thereof, the frame being securable relative to an aperture in the floor of greater size than a lesser aperture into the top of said trunking, said lesser aperture to be within the first-mentioned aperture; and a subsidiary member fitting within the frame with securement means thereto, such member then extending into said lesser aperture and affording outlet for the service in the trunking, outlet for at least one other service whose feed is outside the trunking then being available from at least one side of the subsidiary member but within the frame.

The subsidiary member may be of flanged channel section with its channel sides closing off upper section portions of the trunking to define, conveniently in further cooperation with upper side portions of the trunking, a box inset into the trunking at said lesser aperture. Service is readily taken from said outlet or outlets of said inlet inset box with is segregation from other services maintained, e.g. as is often required for electric power feed. Within the frame, however, further provision can be made for other services to be taken out from one or both sides of the subsidiary member.

Conveniently, a top closure for the aforesaid frame has exit provision for service take-offs and is above the aforesaid trunking at installation. That exit provision can be via cut-outs from confronting edges of top flaps hinged to the frame. Other services accessible to a side or sides of the trunking can have outfeeds via the same exit provision, usually from a suitable further member or members spaced from said subsidiary member and affording outlet location in allowing connections to said other services segregated from the trunked service, usually also from each other insofar as coming from different sides of the trunking and first-mentioned subsidiary member.

A particularly advantageous aspect of access units hereof concerns their top closures as especially related to hinging of at least one part of a top closure to the associated frame via multiple pivotted links that allow such top part to be raised bodily from the frame as well as swing like a hinge, preferably so that the top part can stand upright with its end tucked between link pivots to the frame and the frame itself, but alternatively simply displaced bodily sideways from its closed position. Normally, the links will not go to or over centre in clearing the adjacent side of the frame. A frame with a top as two such hinged halves each on two links at each side thereof is found to be particularly advantageous.

Practical implementation will now be specifically described, by way of example, with reference to the accompanying drawings, in which:

FIG. 1 is a section through part of a floor corresponding to the above mentioned application No. 8507914 (P1466); and fitted with an access unit;

FIG. 2 shows frame top and one set of hinge links of that access unit;

FIG. 3 shows those parts hinged together in one position; and

FIG. 4 shows fitting of interior parts of the access unit.

In the drawings, a flooring system added on to an existing floor as a base or substrate 10 is shown as comprising effectively suspended new floor panelling 12 at a spacing 14 from the base or substrate 10 as defined by elongate supporting elements 16. The latter are, in this specific case, of two types, of which one (16A) is trunking for isolating electric power feeds, and the other (16B) serves as a divider to allow further segregation of other service feeds to each side of the trunking 16A, three-way segregation being assumed in FIG. 1 at 20A, 20B and 20C.

Shown let into the floor panelling 12 at a suitable aperture 22 (which could be cut by a jig-saw) is a services access unit 24 hereof. Turning to FIG. 2, such access unit 24 comprises a frame comprised of side (26A, 26B) and end (28A, 28B) pieces readily formed from sheet material to have inward lower flange returns 30 and spot weld corner overlaps 32. The returns at sides 28A, 28B of the frame are readily provided with series of elongate slots for adjustably fixing subsidiary inner parts thereto (see FIG. 4). In addition, of course, screw studs 34 are shown for adjustment purpose in relation to flush fixing relative to particular floor panellings.

A top for the frame is shown as comprising two parts 36A, 36B that meet at confronting edges 38A, 38B having cut-outs 40A, 40B to serve in locating outlet provisions, usually of moulded plastics type having a gripping or clamping action on electric cable or cord. Each top part 36A, 36B (but shown only for 36A) has an elongate bracket 42 with downturned ends 44A, 44B apertured at 46A, 46B to serve in pivotting to two-link hinging means, see 48A, 48B, for securing to the top parts 36A, 36B to the sides 28A, 28B of the frame, see holes 50.

Turning to FIG. 3, the two-link hinging 48A, 48B is shown arranged such that the top part 36 concerned can, after raising on its links, be positioned upright with its edge 52 placed inside the then nearest end 28 of the frame and without the links 48A, 48B going to alignment, let alone over centre. It should be self-evident that the links 48A, 48B further allow the top part 36 to be raised above the frame and translated away from the end 28 nearest its hinging to the sides 28.

FIG. 4 shows the access unit with frame side 28B omitted, frame end 26B short at that end, and frame end 26A omitting its bent ear 32 at that end. However, FIG. 4 does show how a subsidiary member 60 of channel section, having flanged sides 64 each of which is comprised of a generally vertically extending part 61 and a horizontally extending part 62, and is readily affixed thereby to flanging 30 of the two sides 28A, 28B of the frame. Moreover, sides 64 of the subsidiary member 60 (see also dashed in FIG. 1) match the shape of the upper portion of the isolation trunking 16A, which normally has a cover, and that cover, or other top of the trunking 16A, is gapped or otherwise cut away at a position within the frame of the access unit, i.e. terminating to each side of flanged parts 62, for the purpose of affording a lesser aperture within the aperture 22 and into which the subsidiary member 60 is further let into the trunking 16A. The base of the subsidiary member 60 has holes 66 for standard service outlets, e.g. electric power sockets. FIG. 1 also shows in dashed lines simple other provisions 70A, 70B for supporting access provisions, such as plugs or jacks, to other services, such as communications, i.e. telephone, computer, etc.

I claim:

1. A service access unit for such services as electrical power, telephone and computer communication and the like in a floor system disposed above a subfloor having elongate trunking with a top portion for one service feed segregated from other service feed or feeds, the unit comprising a frame to extend across such elongate trunking and beyond such elongate trunking at least to one side thereof, the frame being securable relative to and being not larger than an aperture in the floor of greater size than a lesser aperture into the top of the trunking, said less aperture to be within the first mentioned aperture, the frame having sides; and a subsidiary member having flanged sides and fitting within the frame with the flanged sides connected to two of the sides of the frame, such subsidiary member extending into said lesser aperture with the flanges sides closing off upper section portions of the trunking to define a box inser into the trunking and affording outlet for the service in the trunking, outlet for at least one other service whose feed is outside the trunking being available from at least one side of the subsidiary member but within the frame.

2. A service access unit according to claim 1, wherein the base of the subsidiary member cooperates in locating at least one outlet specific to the service segregated in the trunking.

3. A service access unit according to claim 1, wherein the sides of the frame are of angle form and connection of said flanging thereto is through superposed flanges of each.

4. A service access unit according to claim 1, wherein the frame further includes at least one other member secured thereto and spaced from said subsidiary member and affording location for outlets for at least one service segregated from that in the trunking to a side thereof.

5. A service access unit according to claim 1, further comprising a top closure for the frame which top closure has exit provision for service take-offs.

6. A service access unit according to claim 5, wherein the top closure comprises top flaps hinged to spaced ends of the frame, respectively, and having confronting edges when closed down.

7. A service access unit according to claim 5, wherein said exit provision for all services is at cut-outs in said confronting edges.

8. A service access unit according to claim 5, wherein at least one part of the top closure to the frame is hinged to the frame via multiple pivotted links that allow such top closure to be raised bodily from the frame as well as swung like a hinge.

9. A service access unit according to claim 8, wherein said multiple pivotted links afford a non-closure position for said top closure wherein the top closure is alternatively stood upright between pivots to the frame end and the frame itself, or stood beyond the frame's side from its closed position.

* * * * *